United States Patent [19]

Akashi

[11] Patent Number: 4,847,752
[45] Date of Patent: Jul. 11, 1989

[54] DATA PROCESSING APPARATUS HAVING AN INPUT/OUTPUT CONTROLLER FOR CONTROLLING INTERRUPTIONS

[75] Inventor: Mineo Akashi, Tokyo, Japan

[73] Assignee: NEC Corporation, Tokyo, Japan

[21] Appl. No.: 748,635

[22] Filed: Jun. 25, 1985

[30] Foreign Application Priority Data

Jun. 25, 1984 [JP] Japan ............................ 59-130465

[51] Int. Cl.⁴ ............................................ G06F 13/24
[52] U.S. Cl. .................................................. 364/200
[58] Field of Search .......................... 364/200 MS File

[56] References Cited

U.S. PATENT DOCUMENTS

| | | | |
|---|---|---|---|
| 3,905,025 | 9/1975 | Davis et al. ............... | 364/200 |
| 4,217,638 | 8/1980 | Namimoto et al. ........ | 364/200 |
| 4,293,909 | 10/1981 | Catiller et al. ............ | 364/200 |
| 4,438,489 | 3/1984 | Heinrich et al. ........... | 364/200 |
| 4,491,912 | 1/1985 | Kainaga et al. ............ | 364/200 |

Primary Examiner—Thomas M. Heckler
Assistant Examiner—Maria Napiorkowski
Attorney, Agent, or Firm—Sughrue, Mion, Zinn, Macpeak, and Seas

[57] ABSTRACT

A data processing apparatus includes an interruption control unit having an associative memory which is used to store a priority data of an interruption and a mode data designating an interruption operation mode. A sequential scanning data is applied according to a priority order to the associative memory. Thus, the mode data required to operate the interruption can be selected and transferred to an interruption processing unit by comparing the stored priority data with the applied scanning data in the associative memory without control of a central processing unit.

7 Claims, 2 Drawing Sheets

DATA PROCESSING APPARATUS HAVING AN INPUT/OUTPUT CONTROLLER FOR CONTROLLING INTERRUPTIONS

BACKGROUND OF THE INVENTION

1. Field of the Invention 'The present invention relates to a data processing apparatus, and particularly to a data processing apparatus having an input/output controller for controlling interruptions.

2. Description of the Prior Art

A data processing apparatus such as a microprocessor integrated on a single semiconductor chip has in general an input/output controller which is called an interruption controller. The input/output controller of this type controls an interruption operation of a data processing apparatus. If an interruption request is generated in accordance with a certain factor, the input/output controller receives an interruption request signal and indicates generation of the interruption to a central processing unit (referred to as a "CPU" hereinafter) of the data processing apparatus. The CPU stops a program execution and then executes an interruption operation based on that factor. Thus, a variety of processes can be performed by one data processing apparatus. Therefore, the input/output control, particularly an interruption control, is one of the important features of the data processing apparatus.

Recently, several processing modes have been proposed as the input/output control mode, and the following two processing modes have been typically used in a data processing apparatus.

A first processing mode is a normal interruption mode in which information required to restart the program to be stopped by an interruption are sheltered, and thereafter the CPU executes a process corresponding to the interruption. In this mode, the CPU directly executes the interruption operation.

A second processing mode is a specific interruption mode in which the CPU stops a program execution without sheltering the information required to restart the program to be stopped. In this mode, the CPU does not directly execute an interruption operation, and therefore, the sheltering of the information is unnecessary. However, the CPU must release a signal bus and/or a memory for an interruption operation by which data is directly transferred between and input/output device (a peripheral device) and a memory. The direct memory access (DMA) is included in this second processing mode.

Many factors may occur in an application system using a data processing apparatus that require the above-mentioned input/output control (interruption control). Further, all input/output controls are not always performed in the same processing mode. Moreover, a priority order is to be assigned to a plurality of factors. That is, a variety of factors and processing modes are required in a data processing system. A general-purpose data processor, such as a microcomputer, requires that the input/output controller, which can designate the priorities and processing modes of the input/output processing at will, shall operate in accordance with an application system.

In general, the factors can be classified into external and internal ones. The external factors occur outside of a data processing apparatus and create special or a predetermined status for the apparatus; examples are proven failures and the generation of an external interruption request signal from a peripheral unit, a DMA controller, another data processing apparatus, or the like. The internal factors occur within the data processing apparatus when an internal interruption signal is generated by a source built into the data processing apparatus for example, an internal timer, an analog to digital converter, a digital to analog converter, a serial data interface unit, or the like. These internal interruption signals are generated, for example, when a predetermined time period has elapsed, when an analog/digital conversion has terminated, or when a serial data has been sent from or received at the interface unit.

In case there are a variety of the above-mentioned factors, a plurality of factors may be concurrently generated, or another factor may be generated during the processing of a certain factor. This makes it difficult to judge and control the priorities of the plural factors. For example, in an application system in which an external unit must be driven on real time when a drive signal is produced for each set time of the internal timer, the internal interruption request signal from the internal timer is to be judged with the highest priority order. In contrast, when an application system requires a high-speed data transmission between a data processing apparatus and an external peripheral unit, an external interruption request signal is to be accepted as soon as possible.

As described above, since the priorities of the input/output controls in one application are different from that of another application, the priorities must be arranged with the optimum order in the required application system.

On the other hand, with respect to the processing modes, they are also variable in the desired application systems. As to the internal timer, for instance, in the case that the driving signal to be sent to the external unit is preliminarily stored in a memory, the driving signal can be taken out of the memory according to the direct memory access (DMA) mode. While, in the case that status of a peripheral unit or an external signal is sampled at every time interval as determined by the internal timer, the CPU has to execute the sampling operation by means of the normal interruption mode.

A data processing apparatus proposed in the prior art has been expensive because it requires a complicated control circuit so as to set the priorities and processing modes of the input/output controls at will. In the low priced systems, therefore, the priorities and processing modes are frequently fixed for each factor so that they raise troubles for some applications. If, in the aforementioned examples, the internal input/output control of the internal timer is fixed at a higher priority than the external input/output control, the interruption operation would have to be deactivated in order to permit the lower priority event to be handled, for example where the data must be inputted at a high speed in response to an external input/output control request signal. On the other hand, the processing modes have been also frequently fixed at a normal interruption mode only. In the aforementioned internal timer application in which the driving signal is outputted in real time to the outside for each set time of the internal timer, the CPU execution has to be temporarily stopped in accordance with the interruption processing. Further, since the DMA mode can not be used, information relating to the CPU execution must be sheltered, and then the interruption program must be searched and read out of an instruction memory. Thus, there also arises a problem that the response time from the detection of time lapse of the internal timer to the signal output to the outside is extended.

SUMMARY OF THE PRESENT INVENTION

An object of the present invention is to provide a data processing apparatus in which a priority order can be variably assigned to an interruption process and can be judged at a high speed.

Another object of the present invention is to provide a data processing apparatus which can quickly respond to an interruption request signal.

Another object of the present invention is to provide a data processing apparatus in which a plurality of processing modes can be variably set therein.

Still another object of the present invention is to provide a low-cost data processing apparatus in which a priority order and/or a processing mode can be easily set and changed in accordance with an application system.

A data processing apparatus according to the present invention comprises a central processing unit (CPU), a read-write memory unit having a plurality of memory stages, each memory stage including a first memory area storing interruption request data in response to an interruption request signal and a second memory area storing priority data designating the priority order with which the interruption request data is to be stored in the first memory area of the same memory stage, a scanning unit coupled to the memory unit which applies scanning data in a predetermined order to the read-write memory unit, the memory unit having means for comparing the scanning data with the stored priority data and means for generating a response signal when for any given memory stage said comparing means detects a coincidence between said scanning data and said priority data in said memory stage second area and said interruption request data stored in said memory stage first area said comparing means and a control unit applying a control signal to the CPU in response to the response signal.

According to the present invention, the priority data to be stored in the second memory area of each memory stage can be changed by the CPU, because the priority data is set in the read-write memory (e.g. RAM, PROM). Further, the read-write memory unit has means for comparing the stored priority data with the scanning data. The scanning data is sequentially varied in the predetermined order, e.g., from a data representing the highest priority to that representing the lowest priority. If the second memory area of a memory stage stores priority data which is judged to be coincident with the scanning data, and the first memory area of that same stage actually stores the interruption request data, the response signal is automatically generated from the memory unit. Thus the CPU can easily recognize the interruption request.

In the present invention, each memory stage may have a third area storing a processing mode (e.g. normal interruption mode, DMA mode) in order to set the processing mode at will in accordance with an application system in which the data processing apparatus of the present invention is employed.

The read-write memory unit may preferably have an associative memory function such as a content-addressable memory. Thus, an interruption request can be searched at a high speed without using the CPU. Furthermore, even if the priority data and/or the processing mode is changed, the scanning operation needs not be changed to search an interruption request.

DETAILED DESCRIPTION OF THE EMBODIMENT

Figure 1:
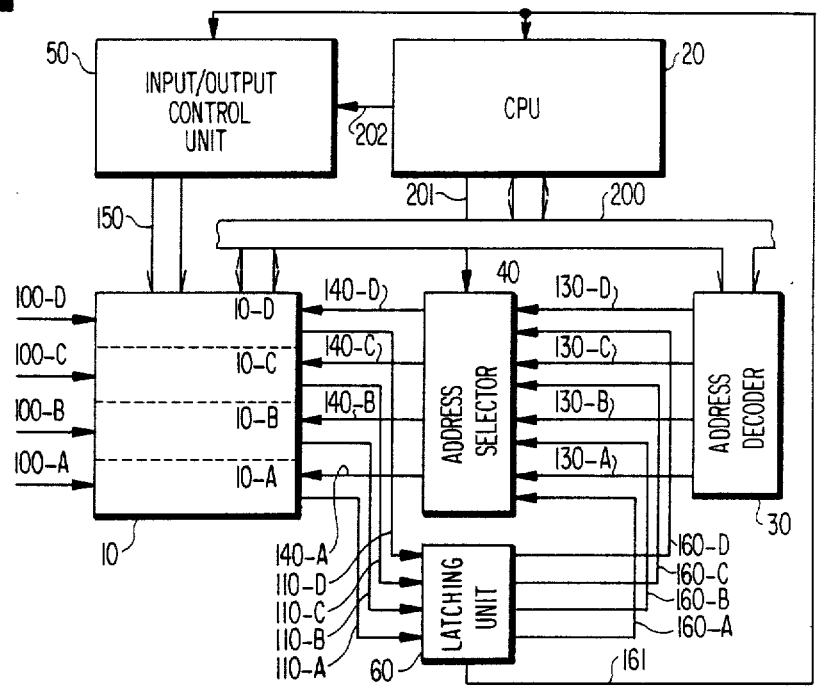
FIG. 1 is a block diagram showing the data processing apparatus having the input/output controller according to one embodiment of the present invention.

The present invention will be described in the following in connection with the embodiment thereof with reference to the drawings. FIG. 1 is a block diagram showing a data processing apparatus (a data processor) which is equipped with an input/output controller.

In the present embodiment, it is assumed that four interruption factors for the input/output controls are employed, and the portions corresponding to the respective factors are indicated by suffixes A, B, C and D attached thereto.

A control data memory unit 10 has a storage capacity of four words, or four stages, 10-A to 10-D, each of which corresponds to one of the four respective factors. Each stage 10-A, 10-B, 10-C, and 10-D comprises a read-write memory to store a plurality of data. The memory unit 10 further has read-write circuit for writing data into the respective memory stages 10-A to 10-D and reading data out of the respective memory stages. The read-write memory of each stage includes a first memory area in which the interruption request data 100-A, 100-B, 100-C or 100-D is stored, a second memory area in which a mask data for allowing or inhibiting an interruption operation is stored, a third memory area which stores data designating a processing mode, and a fourth memory area which stores priority data designating a priority of the interruption request data stored in the first memory area of the same stage. The interruption request data is written in the first memory area according to the respective interruption request signal applied to the memory unit 10, while data to be set in the second to fourth memory areas are written by a central processing unit (CPU) 20.

Given a start time or an arbitrary time in a CPU operation, the CPU 20 sends out an address signal designating a stage of the control data memory unit 10 to an address decoder 30 through a signal bus 200. The CPU also sends an access signal 201 to an address selector 40 and data to be stored in the designated stage to the memory unit 10 through the bus 200. The decoded outputs 130-A to 130-D of the address decoder 30 are selected by the address selector 40 in response to the access signal 201 and are transmitted as word designating signals 140-A to 140-D to the control data memory unit 10 so that the selected stage is accessed to reset the first memory area and to write the mask data, the processing mode data and the priority data through the signal bus 200 from the CPU. Under this writing operation, the CPU can set the processing mode data and the priority data as required in the application system. The mask data is written in the second area only when a certain interruption request is required to be masked.

Thereafter, when an interruption request signal (100-A, 100-B, 100-C or 100-D) is generated from an interruption source (not shown) according to an interruption factor, it is written into a first memory area of the corresponding memory stage. In this case, the interruption request signals 100-A to 100-D may be generated from an internal interruption source or an external interruption source.

The interrupt can be searched without the need for access by the CPU 20 to the control data memory unit 10 to the end, and input/output processing control unit 50 sequentially generates scanning data to scan each memory word and applies the data to the memory unit 10 through a scanning bus 150 which is provided separate from the signal bus 200 coupled to the CPU 20. Therefore, the scanning operation can be performed regardless of the CPU operation. As the result, a multi-interruption operation can be performed as described hereinafter.

In this scanning operation, the scanning data is the same as the priority data stored in the fourth memory area of one of the memory stages 10-A to 10-D. The scanning data is changed one by one in the order from the data representing the highest priority to that representing the lower priority in every scanning operation. The scanning operation is continuously repeated if no interruption request data is set in the first memory area of each memory stage.

If, however, at least one interruption request data is set in the first area of a memory stage or stages, one of the response signals 110-A to 110-D is generated when the scanning data coincides with the priority data stored in the same memory stage. For example, if the interruption request data is stored in the first area of the memory stage 10-C, the response signal 110-C is generated only when the scanning data applied to the memory unit 10 is identical to the priority data stored in the fourth area of the memory stage 10-C. When the response signal 110-A, 110-B, 110-C or 110-D is generated, it is sent to a latching unit 60. Upon receipt of the response signal, the latching unit 60 generates a control signal 161 indicating that an interruption is received. The latching unit 60 has storage locations (e.g. latch or register circuits) corresponding to the four response signals 110-A to 110-D. The response signal sent front from the memory unit 10 is temporarily stored in the corresponding storage location.

The control signal 161 is applied to both the CPU 20 and the input/output control unit 50 simultaneously. The CPU 20 stops the operation, immediately or at a predetermined timing, which is now being performed, in response to the control signal 161 and generates the access signal 201. In response to this access signal 201 the selector 40 selects the output 160-A to 160-D of the latching unit 60. That is, the response signal 110-A, 110-B, 110-C or 110-D, which has been latched in the latching unit 60 and applied to the selector 40 as a signal 160-A, 160-B, 160-C or 160-D, is sent to the corresponding memory stage of the control data memory unit 10 as an address signal 140-A, 140-B, 140-C or 140-D. For example, if the response signal 110-C is generated, it is sent through the latching unit 60 and the address selector 40 to the memory stage 10-C as the address signal 140-C.

The input/output control unit 50 stops the scanning operation in response to the control signal 161 and stores information indicating the priority order of the scanning data by which the response signal 110 is generated. The input/output control unit 50 stores the particular priority data that is set in the memory stage, e.g. 10-C, from which the response signal, e.g. 110-C, is outputted.

In addition, all the data stored in the memory stage, e.g. 10-C, which has been designated by the response signal, e.g. 110-C, are read out and transferred to the CPU 20 through the signal bus 200. Thus, the CPU 20 recognizes the read-out data and thereafter, resets the first area (a bit for interruption request data) of the memory stage, e.g. 10-C, from which the data are read out.

At this point, the input/output control unit 50 is storing the data designating the accepted priority order and begins to perform priority scannings for interrupt request having a higher priority than that now stored. The priority data to be scanned in this subsequent scanning operation will only comprise those interruption conditions having a priority higher than the priority now stored. If the response signals 110-A to 110-D are generated in this operation, the input/output control unit 50 will only detect that an new interruption request with a higher priority than that of the interruption now being processed has been generated. Should a higher priority interrupt be detected, the same operation as previously described will occur and the control signal 161 will be applied to the CPU 20. Then the CPU 20 generates the access signal 201 to select the output 160 of the latching unit 60, whereby the control word corresponding to the newly received interruption is sent to the CPU. Thus the CPU can execute a multi-interruption operation.

When one interruption operation is completed, the CPU 20 generates a termination signal 202 to reset the priority being stored in the control unit 50 in this reset operation, in the case that the interruption with higher priority is accepted during the interruption with higher priority of the low priority, the low priority data of the interruption which has been stopped is set, while in the case that the new interruption is not accepted, the priority data stored is cleared.

To summarize the above operation, an interruption request signal 100, which may be generated within the data processing apparatus or may be applied from the outside of the data processing apparatus, is written into a first area of the corresponding memory stage in which the processing mode data, and the priority data are preliminarily set by the CPU. The control unit 50 scans memory stage according to the priority order. This scanning can be independent of the CPU operation. As the result of the scanning, if at least one interruption request signal has been received, the memory unit generates a response signal automatically. The judging unit 60 applies the control signal 161 designating the interruption reception to the CPU 20 and the control unit 50. In response to this control signal 161 the CPU stops an operation and selects the output 130 of the latching unit 60 by controlling the selector 40. Thus, the control word set in the memory stage from which the response signal is generated is automatically sent to the CPU 20 through the signal bus 200.

Figure 2:
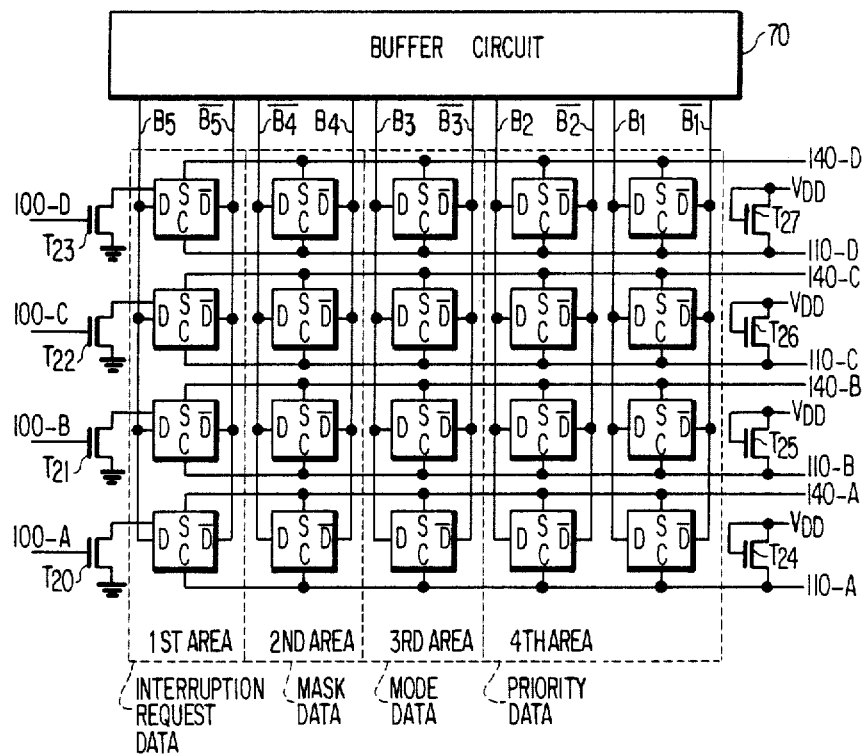
FIG. 2 is a diagram showing one example of the control data memory unit 10 of FIG. 1.

FIG. 2 shows an embodiment of the control data memory unit 10 of FIG. 1. In this embodiment, the lines of a five-bit memory cell array are assigned to control words corresponding to the respective interruption factors, whereas the columns are assigned, as shown in broken lines in FIG. 2, to the interruption request data, the mask data, the processing mode designating data and the priority designating data. On the other hand, the interruption request signals 100-A to 100-D, the response signals 110-A to 110-D and the word designating signals 140-A to 140-D are made identical to those of FIG. 1.

Figure 3:
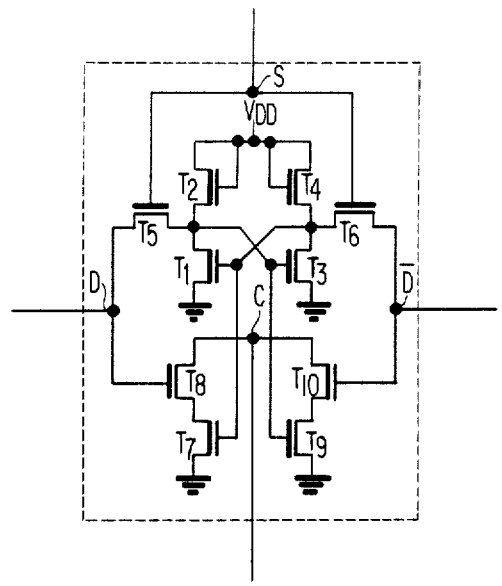
FIG. 3 is a transistor circuit diagram of one cell of the memory unit 10.

Here, an embodiment of each memory cell will be described in detail with reference to FIG. 3. FIG. 3 is a transistor circuit diagram showing a content-addressable memory (CAM) of one bit (in terms of the CAM cell).

This CAM cell is composed of ten transistors $T_1$, $T_2$, ..., and $T_{10}$ for storing data of one bit and is equipped with data input/output nodes D and $\overline{D}$ for true and complement signals, an input node S receiving a cell selecting signal, and an output node C for a response signal. The transistors $T_1$ and $T_2$, and $T_3$ and $T_4$, which are connected in series between a power supply $V_{DD}$ and the ground, constitute together an inverter circuit and act as a flip-flop to store the data of one bit.

In case the stored data of the cell is read out, the cell selecting signal S is generated to turn-on the switching transistors $T_5$ and $T_6$. Thus, data stored in the flip-flop is read out of the nodes D and $\overline{D}$. In case data is written in the cell, the true and complement of the data to be written are applied to the nodes D and $\overline{D}$, respectively, when the cell selecting signal S is generated, and the data is written in the flip-flop.

Here, when the cell is to be stored with a logical value 1, the node between the transistors $T_1$ and $T_2$ is set at the high level, and the node between the transistors $T_3$ and $T_4$ is set at a low level. In case a logical value 0 is to be stored, on the contrary, the node between the transistors $T_1$ and $T_2$ is set at the low level, and the node between the transistors $T_3$ and $T_4$ is set at the high level. The four transistors $T_7$ to $T_{10}$ are provided for comparing the content stored in the cell with the data received at the nodes D and $\overline{D}$. If both of the data are the same, the response signal is outputted from the node C.

The CAM cell shown in FIG. 3 can be used in the second area (mask data), the third area (processing mode) and the fourth area (priority data), but must be modified to use in the first area (request data). That is, a CAM cell of the first area has to be set in response to an interruption request signal 100. For the purpose, as shown in FIG. 2, transistors T20 to T23 are added respectively to the CAM cells in the first area of the memory unit 10. Each of the transistors T20 to T23 is connected in parallel to the transistor T3 (FIG. 3) of the associated CAM cell, and is turned ON in response to the application of the associated one of the interruption request signals 100-A to 100-D to set a logical value 1 into the associated CAM cell in the first area.

In FIG. 2 four transistors T24 to T27 act as pull-up transistors for the node C of each CAM cell. That is, the logical value 1, as the response signal 110-A to 110-D, is taken out when at least one of the transistors $T_7$ and $T_8$ and at least one of the transistors $T_9$ and $T_{10}$ are turned off. In other words, if any node C of the control word is coupled to the ground the response signal with the logical value 0 is generated. A buffer circuit 70 is made operative, when the CPU 20 writes and sets the control words and when the input/output control unit 50 scans the control words and reads out the control words when the designating signals 140-A to 140-D are applied to the nodes S as the designating signals 140-A to 140-D.

The comparison operation of the memory unit 10 will be described below. Table 1 shows a status of the node C of one CAM cell when the cell data is compared with the scanning data. t,0200

As shown in Table 1, when a scanning data 0 (D=0, $\overline{D}$=1) is applied to the nodes D and $\overline{D}$, the node C becomes 0 when the cell data is 0, while the node C becomes 0 when the cell data is 1. When a scanning data 1 (D=1, $\overline{D}$=0) is applied, the node C becomes 0 when the cell data is 1, while it becomes 1 when the cell data is 0. Further, when 0 is applied to both the nodes D and $\overline{D}$, respectively, the node C becomes 1 regardless of the cell data. On the other hand, when 1 is applied to both the nodes D and $\overline{D}$, respectively, the node C becomes 0 regardless of the cell data. In other words, when the inverted logical input data are applied to the nodes D and $\overline{D}$, an exclusive OR signal indicating the incoincidence between the input data and the stored cell data is generated at the node C so that the comparison can be performed. In case the logical data 0 is applied to both of the nodes D and $\overline{D}$, the logical data 1 equivalent to that of a coincidence between scan data and cell data is generated independently of the stored cell data so that the comparison with the stored content can be masked. In case the logical data 1 is applied to both of nodes D and $\overline{D}$, the logical value 0 is generated independently of the stored cell data so that a result indication incoincidence can be unconditionally outputted.

By arranging the CAM cell of FIG. 3 to have a structure of lines and columns thereby to couple the node C in Parallel, it is possible to realize the control data memory unit 10 which can judge the content in terms of words.

The operations of the present embodiment will be described in the following with reference to the time chart of FIG. 4.

Figure 4:
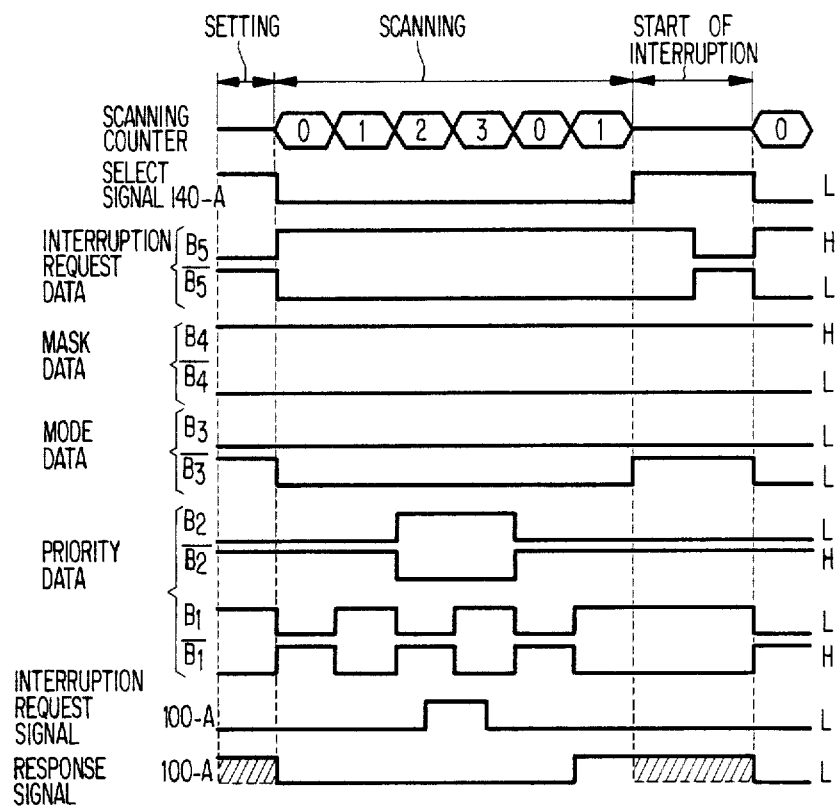
FIG. 4 is a timing chart of a scanning operation.

In FIG. 4, as is represented by the first interruption factor A, the input/output control sequence comprising the setting of the control data, the scanning of the control data memory unit 10, the generation of the (interruption) request, and the start of the input/output processing is corresponding expressed in terms of the word designating signal 140-A of the priority scanning counter and the control data memory unit 10, the data input/output line signals $B_1$ to $B_5$ and $\overline{B}_1$ to $\overline{B}_5$, the processing request signal 100-A and the response signal 110-A.

First of all, the control concerning the factor A is set by the central processing unit 20. As described with reference to FIG. 2, the high level is generated at the data line $B_n$ (wherein n corresponds to the bit position and takes a value of 1 to 5) whereas the low level is generated at the data line $\overline{B}_n$ in case the logical value 1 is to be written in. The low level is generated at the data line $B_n$ whereas the high level is generated at the data line $\overline{B}_n$ in case the logical value 0 is to be written in.

In the time chart of FIG. 4: the request data of first area is cleared to the logical data 0; the mask data of the second area is set at the logical data 1 to allow the processing request; the processing mode designating data of the third area is set at the logical data 0 to designate a normal interruption operation; and the priority designating data of two bits in the further area are set at the logical values 0 and 1, respectively, to designate the second priority order. When the settings of the control data are thus completed, the scanning operation of the input/output control unit 50 is started. At this time, the control unit 50 sends the data 1 as the first area scanning data ($B_5$=1, $\overline{b}_5$=0), the data 1 as the second area scanning data ($B_4$=1, $\overline{B}_4$=0), the mask data as the third area scanning data ($b_3$=0, $\overline{B}_3$=0) and the priority data as the fourth area scanning data ($B_1$, $\overline{B}_1$, $B_2$, $\overline{B}_2$) to the memory unit 10. The priority data is changed from the highest order (1, 1) to the lowest order (0, 0) as shown in FIG. 4.

In the time chart of FIG. 4, it is judged that the interruption request data of the first area is at the logical data 1 indicating the generation of the processing request, that the mask data of the second area is at the logical data indicating the allowing state, and that the priority designating data of the fourth area are at the data coincident with the values of the priority scanning counter. Incidentally, the processing mode designation data of the third area is so controlled by setting the data lines $B_3$ and $\overline{B}_3$ at the low level that they may not be the target of judgment. Before the interruption request signal 100-A is generated, the processing request data of the first area is at the logical data 0 so that the response signal 110-A is not generated even if other conditions are satisfied. After the request signal 100-A is generated so that the request data is set, the response signal 110-A is generated when the data of the priority scanning counter and the priority designating data are coincident, i.e., when the second priority order is scanned, and the response signal 110-A is stored in the latching unit 60.

When the aforementioned response signal 110-A is generated, the CPU 20 starts the input/output processes. At this time, the word selecting signal 140-A is generated on the basis of the response signal stored in the latching unit 60, and the respective stored bit data of the columns having generated the responses are extracted to the data lines $B_n$ and $\overline{B}_n$ and transmitted via the buffer circuit 70 to the CPU 20. Thus 20 executes the interruption operation according to a normal interruption because it judges the data of the third area in the control word transmitted at the logical value 0. Next, while the word selecting signal 140-A based upon the aforementioned response word data is being generated, the signal at the low level is generated on the data line $B_5$ whereas the signal at the high level is generated on the data line $\overline{B}_5$, and the logical value 0 indicating the reception of the processing request is stored in the first area of the control word A.

In the present embodiment, the control data memory unit 10 uses wholly the CAM cells. However, the processing mode designating data need be neither compared nor judged so that the cells having a less number of transistors can be used. Since the interruption request data and the mask data have a limited number of logical data to be judged, the transistors in the CAM cells can be eliminated so that the input/output control unit 50 at a lower price can be realized.

According to the present invention, the data for designating the modes and priorities of the interruption processes can be stored in the memory element array of the cells having the fewer number of transistors to control the input/output processing start. As a result, the data processing apparatus to be realized by the semiconductor integrated circuit such as the microcomputer can have its chip area reduced to exhibit an outstanding effect for reducing its price.

What is claimed is:

1. A data processing apparatus comprising:
a central processing unit,
a memory unit having a plurality of addressable memory stages, each memory stage including a plurality of areas comprising at least a first memory area for storing interruption request data according to an interruption request signal generated when an interruption operation is required and a second memory area for storing priority data designating an order of priority for one interruption request, as among all other interruption requests, to be stored in the first memory area of said memory stage;

a plurality of groups of data lines, each group of lines connecting a respective group of like-designated areas of all memory stages;

a data bus connecting said central processing unit to said memory unit;

first means for applying a scanning data in a predetermined order to said memory unit, said memory unit having comparing means for comparing said stored priority data in said second memory area of each memory stage with said scanning data to generate a response signal when there is a coincidence between the priority data stored in said second area of a particular memory stage and said scanning data and interruption data is present in the first area of said particular memory stage, latching means for receiving and temporarily storing said response signal, said latching means also applying a signal designating an interruption reception to said central processing unit in response to said response signal, means inserted between said latching means and said memory unit for receiving and feeding back said stored response signal to said particular memory stage to access said particular memory stage and to read out the content thereof, and means for transferring the read-out content of said particular memory stage to said central processing unit via said data bus.

2. A data processing apparatus having an interruption control unit, said interruption control unit comprising an associative memory comprising a plurality of memory sections, each memory section including a plurality of memory areas comprising at least a first area for storing an interruption request data according to an interruption signal generated when an interruption operation is required, a second area for storing operative mask data representing whether or not an interruption operation is acceptable, a third area for storing operating mode data, and a fourth area for storing priority data representative of an order of interruption priority, means for sequentially applying a plurality of scanning data according to a priority order of interruption to said associative memory, each memory section generating a response signal when the scanning data applied thereto is coincident with the priority data stored in the fourth area thereof, when the first area thereof stores said interruption request data and when the second area thereof stores the operative mask data representing that the interruption operation is acceptable, means coupled to said associative memory for latching said response signal, and means inserted between said latching means and said associative memory for applying the stored response signal to the memory section which has generated said response signal, whereby said memory section which has generated said response signal is made access so that the content thereof is read out.

3. In a data processing system having a central processing unit (CPU), capable of operating on plural modes, and a common data bus connected thereto, a priority interrupt circuit connected to said CPU via said common bus, that permits said CPU to have a prioritized response to a plurality of detected interruption conditions comprising:

read/write means having a plurality of addressable stages, each stage being adapted to store information relating to a respective one of said interruption conditions and having a plurality of storage areas, including at least a first area for receiving and temporarily storing a first signal representative of a request of an interruption operation and a second area for storing a second signal identifying an order of priority for said interrupt condition as among all applicable interrupt conditions, said read/write means further including a plurality of groups of data lines, each group of lines connecting a respective group of like areas of all addressable stages in said read/write means;

scanning means for sequentially generating a plurality of scan signals, each said scan signal representing an order of priority of all applicable interrupt conditions;

comparison means for comparing the second signal stored in each read/write stage with the scan signals generated by said scanning means and for generating a third signal uniquely related to a given stage when said stored second signal and generated scan signal are identical and the first area of said given stage stores said first signal; and means responsive to said third signal for indicating to said CPU that a particular interruption condition exists and for feeding said third signal back to said given stage to read out the content of said given stage, whereby said CPU is adapted to stop its then current operations, receive the read-out content of said given stage via said common bus, execute an interruption operation responsive to the read-out content of said give stage, and reset the operation of said scanning means to detect other interruption conditions.

4. The data processing apparatus of claim 1 wherein each said memory stage includes a third memory area for storing mask data which indicates whether an interruption operation is permitted or prohibited, and each said memory stage includes a fourth memory area for storing mode data which indicates an operating mode of said central processing unit.

5. The priority interrupt circuit of claim 3, wherein each of said addressable stages further includes a third area for storing mask data which indicates whether an interruption operation is permitted or prohibited, and each said addressable stage further includes a fourth area for storing mode data which indicates an operating mode of said central processing unit.

6. The data processing apparatus of claim 1 wherein each memory area comprises at least one memory cell, each such cell having at least a flip-flop comprising a first and a second transistor, said first memory area further including a third transistor coupled in parallel with one of said first and second transistors and having a control electrode connected to receive each interruption request signal directly when said signal is generated.

7. The data processing system of claim 3 wherein each storage area comprises at least one memory cell, each such cell having at least a flip-flop comprising a first and a second transistor, said first storage area further including a third transistor coupled in parallel with one of said first and second transistors and having a control electrode connected to receive said first signal when the interruption operation is requested.

* * * * *

UNITED STATES PATENT AND TRADEMARK OFFICE
CERTIFICATE OF CORRECTION

PATENT NO. : 4,847,752

DATED : 7/11/89

INVENTOR(S) : Akashi

It is certified that error appears in the above-identified patent and that said Letters Patent is hereby corrected as shown below:

Column 1, line 68, delete "proven", insert --power--;

Column 7, line 68, delete "t,200", insert all of --Table 1--.

Table 1

| Scanning Data Input D | Scanning Data Input $\bar{D}$ | Cell Data | $T_7$ | $T_8$ | $T_9$ | $T_{10}$ | Node C |
|---|---|---|---|---|---|---|---|
| 0 | 0 | 0 | ON | OFF | OFF | OFF | 1 |
| 0 | 0 | 1 | OFF | OFF | ON | OFF | 1 |
| 0 | 1 | 0 | ON | OFF | OFF | ON | 1 |
| 0 | 1 | 1 | OFF | OFF | ON | ON | 0 |
| 1 | 0 | 0 | ON | ON | OFF | OFF | 0 |
| 1 | 0 | 1 | OFF | ON | ON | OFF | 1 |
| 1 | 1 | 0 | ON | ON | OFF | ON | 0 |
| 1 | 1 | 1 | OFF | ON | ON | ON | 0 |

Signed and Sealed this

Twenty-ninth Day of October, 1991

Attest:

HARRY F. MANBECK, JR.

Attesting Officer

Commissioner of Patents and Trademarks